United States Patent
Ohmberger et al.

(10) Patent No.: US 9,874,445 B2
(45) Date of Patent: Jan. 23, 2018

(54) CONTROLLER AND METHOD FOR MINIMIZING SCALE FACTOR ERRORS OF A ROTATION RATE SENSOR

(71) Applicant: NORTHROP GRUMMAN LITEF GMBH, Freiburg i. Br. (DE)

(72) Inventors: Ralf Richard Ohmberger, Denzlingen (DE); Steffen Zimmerman, Teningen (DE)

(73) Assignee: Northrop Grumman Litef GmbH (DE)

( * ) Notice: Subject to any disclaimer, the term of this patent is extended or adjusted under 35 U.S.C. 154(b) by 0 days.

(21) Appl. No.: 15/324,383

(22) PCT Filed: Apr. 17, 2015

(86) PCT No.: PCT/EP2015/000816
§ 371 (c)(1),
(2) Date: Jan. 18, 2017

(87) PCT Pub. No.: WO2016/005015
PCT Pub. Date: Jan. 14, 2016

(65) Prior Publication Data
US 2017/0167877 A1 Jun. 15, 2017

(30) Foreign Application Priority Data
Jul. 7, 2014 (DE) .................. 10 2014 010 056

(51) Int. Cl.
*G01C 19/56* (2012.01)
*G01C 19/5726* (2012.01)
*G01C 19/5762* (2012.01)

(52) U.S. Cl.
CPC ..... *G01C 19/5726* (2013.01); *G01C 19/5762* (2013.01)

(58) Field of Classification Search
CPC .................. G01C 19/5726; G01C 19/5776
(Continued)

(56) References Cited

U.S. PATENT DOCUMENTS

| 2009/0212983 A1 | 8/2009 | Fukuzawa |
| 2010/0132462 A1* | 6/2010 | Nakamura ............ G01C 19/56 73/504.12 |
| 2016/0011254 A1* | 1/2016 | Maeda ............... G01C 19/5726 324/538 |

FOREIGN PATENT DOCUMENTS

WO  2014/119092  *  8/2014  ......... G01C 19/5726

OTHER PUBLICATIONS

International Search Report for Application No. PCT/EP2015/000816 dated Aug. 28, 2015.

* cited by examiner

*Primary Examiner* — John Chapman, Jr.
(74) *Attorney, Agent, or Firm* — Tarolli, Sunheim, Covell & Tummino LLP (57) ABSTRACT

The invention relates to a controller (200) for controlling a rotation rate sensor, having a first control circuit (202) and a second control circuit (204). The first control circuit has a first control unit (210) for controlling an oscillation of the rotation rate sensor along a first direction, a first digital-to-analog converter (240) for converting a first digital control signal (215) output by the first control unit (210) into a first analog signal (245) with which the oscillation of the rotation rate sensor along the first direction is controlled, and a first analog-to-digital converter (250) for converting a first analog measurement signal (235) which describes the oscillation of the rotation rate sensor along the first direction into a first digital read-out signal (255) which is supplied to the first control unit (210). The second control circuit (204) has a second control unit (220) for controlling an oscillation of (Continued)

the rotation rate sensor along a second direction which is different from the first direction and a second digital-to-analog converter (270) for converting a second digital control signal (225) output by the second control unit into a second analog signal (275) with which the oscillation of the rotation rate sensor along the second direction is controlled.

8 Claims, 7 Drawing Sheets

(58) Field of Classification Search
USPC .................................... 702/145; 73/504.12
See application file for complete search history.

CONTROLLER AND METHOD FOR MINIMIZING SCALE FACTOR ERRORS OF A ROTATION RATE SENSOR

RELATED APPLICATIONS

The present invention is a U.S. National Stage under 35 USC 371 patent application, claiming priority to Serial No. PCT/EP2015/000816, filed on 17 Apr. 2015; which claims priority from DE 10 2014 010 056.1, filed 7 Jul. 2014, the entirety of both of which are incorporated herein by reference.

The invention is concerned with a device for minimizing a scale factor error of a rotation rate sensor caused by reference voltages and with a method for minimizing the scale factor error.

In many sensors of today's technology control circuits are used to control single elements of sensors and to adjust them to specific values. Here, it is often necessary to convert a digital control variable into an analog signal by which the element to be controlled can be driven directly. On the other hand, it may be necessary to convert an analog measurement signal, which describes the reaction of the element in response to the analog control signal, into a digital signal that can be compared to the control variable. To this end, digital-to-analog converters and/or analog-to-digital converters are used in sensors for converting the digital into analog and the analog into digital signals, respectively.

The digital-to-analog and the analog-to-digital converters use reference voltages to sample the digital and/or analog signals and to convert them. Typically, the digital-to-analog and/or analog-to-digital converters are integrated into the sensors as prefabricated elements. Here, the problem occurs that the reference voltages used by the converters are not constant over time, but can take in the course of time higher or lower values due to aging. An inherent source for errors in the operation of the sensors that depend on digital-to-analog and/or analog-to-digital converters is therefore aging of the reference voltages used in these converters. The measurement precision of a sensor is affected directly by the aging of the reference voltages, if these are used as scale factors in calculating measurement values by the sensor.

It is therefore desirable to provide a device that minimizes a scale factor error caused by aging of reference voltages. Similarly, it is desirable to provide a method for minimizing such a scale factor error.

Figure 1:
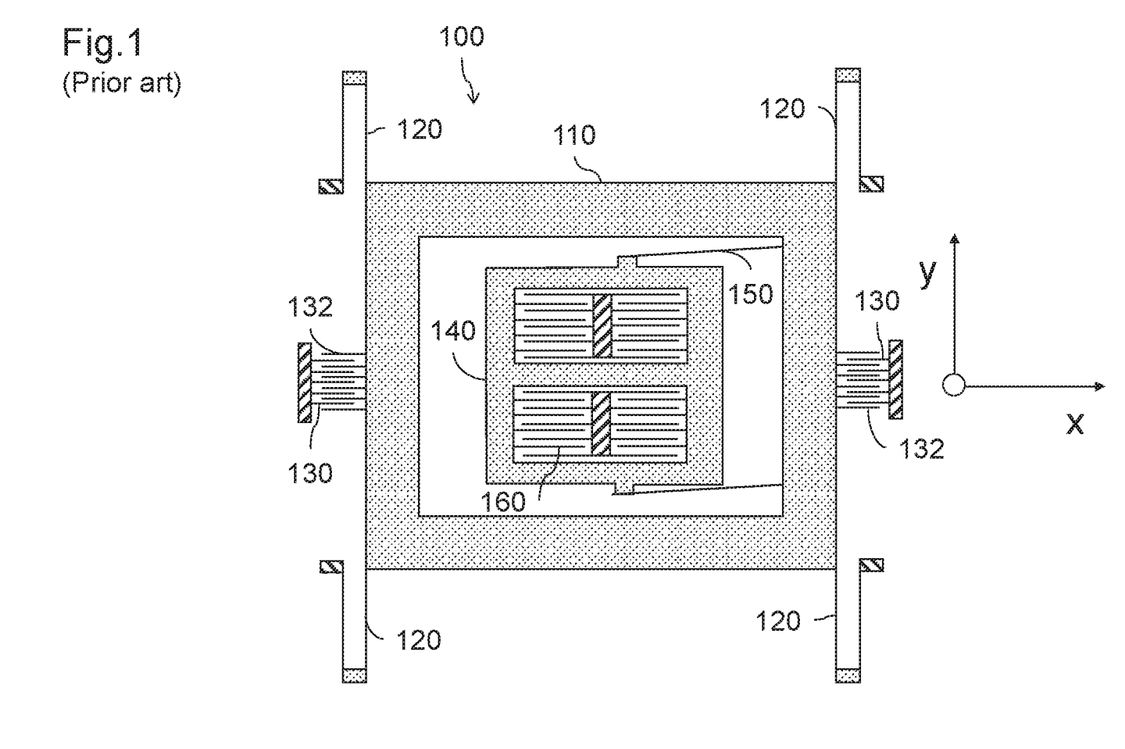
FIG. 1 a schematic block diagram of a rotation rate sensor according to the prior art.

Particularly in the field of rotation rate sensors nowadays digital-to-analog converters and analog-to-digital converters are used. FIG. 1 shows a schematic block diagram of a rotation rate sensor 100. The rotation rate sensor 100 comprises an excitation mass 110 that is connected via first spring elements 120 to a substrate. The spring elements 120 are formed such that the excitation mass 110 is able to oscillate with respect to the substrate in a first direction, whereas an oscillation in a second direction perpendicular to the first direction is prevented by the specific form of the first spring element 120. According to the example of the rotation rate sensor 100 illustrated in FIG. 1 the excitation mass 110 is allowed to oscillate along the x-direction, whereas a deflection along the y-direction is prevented by the form of the first spring element 120, which form is parallel to the y-direction.

Typically, in the rotation rate sensor 100 the oscillation of the excitation mass 110 along the x-direction is generated by excitation electrodes 130. The oscillation is excited by applying specific voltages to the excitation electrodes 130, which are suitable for the excitation. For example, applying an AC voltage to the excitation electrodes 130 leads to a changing electrostatic attraction between the excitation electrodes 130 and electrodes 132 that are connected to the excitation mass 110. This leads to the oscillation along the x-axis.

A readout mass 140 is connected via second spring elements 150 to the excitation mass 110. The second spring elements 150 are formed such that the readout mass 140 is allowed to oscillate along the second direction perpendicular to the first direction, whereas an oscillation of the readout mass 140 with respect to the excitation mass 110 along the first direction is prevented by the form of the second spring elements 150. In the example illustrated in FIG. 1 the readout mass 140 may be deflected along the y-direction, but not along the x-direction. A deflection of the readout mass 140 is detected via the change of a voltage applied to readout electrodes 160. The change in voltage at the readout electrodes 160 allows determining frequency and amplitude of the oscillation of the readout mass 140.

The functional principle of a rotation rate sensor 100 designed according to the block diagram of FIG. 1 is to excite the excitation mass 110 along the x-direction to a precisely defined oscillation. If the rotation rate sensor 100 is rotated around a direction perpendicular to the x- and the y-direction, a Coriolis force will be generated, which deflects the readout mass 140 with respect to the excitation mass 110 along the y-direction. This deflection is proportional to the rotation rate. By means of the readout electrodes 160 that allow detecting the oscillations of the readout mass 140 it is, hence, possible to determine the rotation rate of the rotation around the direction perpendicular to the x- and y-direction.

In order to be able to measure a wide range of rotation rates and in order to obtain a measurement behavior that is as linear as possible, the rotation rate sensor 100 is typically read out such that a voltage is applied to the readout electrodes that counteracts an oscillation of the readout mass 140 with respect to the excitation mass 110. If the size of the counteracting voltage is adjusted such that despite a rotation no oscillation of the readout mass 140 is excited, it is possible to determine the rotation rate by means of the applied voltage. The force compensating voltage may be applied for readout in time multiplex to the same readout electrode 160 or to separate readout electrode(s) 160.

Hence, in a rotation rate sensor 100 according to the state of the art two oscillations are controlled by means of control loops. On the one hand, the oscillation of the excitation mass 110 along the x-direction is adjusted by means of the excitation electrodes 130 to a previously predetermined value. On the other hand, by means of the readout electrodes 160 the oscillation of the readout mass 140 is suppressed, i.e. the amplitude of the oscillation is adjusted to the value zero.

To this end, typically two control loops are used that comprise each a digital-to-analog converter and an analog-to-digital converter. Each of these converters is operated with a reference voltage. The values of the reference voltages occur in a scale factor that defines the relation between the voltage that is necessarily applied to the readout electrodes and the rotation rate. The change of the reference voltage due to aging has therefore direct effects on the scale factor and hence on the measurement precision of the rotation rate sensor. In the worst case, i.e. if reference voltages age such that aging dependent errors cumulate, an error that is caused by the change of reference voltages affects the measurement result to the power of four.

The invention is concerned with the problem to provide a control device for controlling a rotation rate sensor, in which the scale factor error caused by changes, i.e. aging, of reference voltages can be minimized.

This problem is solved by the subject-matter of the independent claims. Advantageous embodiments are defined by the subject-matter of the dependent claims.

A control device for controlling a rotation rate sensor comprises a first control loop and a second control loop. The first control loop comprises a first control unit for controlling an oscillation of the rotation rate sensor along a first direction. In addition, the first control loop comprises a first digital-to-analog converter for converting a first digital control signal output by the first control unit into a first analog signal by means of which the oscillation of the rotation rate sensor along the first direction is controlled. Further, the first control loop comprises a first analog-to-digital converter for converting a first analog measurement signal that describes the oscillation of the rotation rate sensor along the first direction into a first digital readout signal that is supplied to the first control unit. The second control loop comprises a second control unit for controlling an oscillation of the rotation rate sensor along a second direction that is different from the first direction. In addition, the second control loop comprises a second digital-to-analog converter for converting a second digital control signal output by the second control unit into a second analog signal by means of which the oscillation of the rotation rate sensor along the second direction is controlled. Here, the first digital-to-analog converter, the second digital-to-analog converter and the first analog-to-digital converter operate during conversion each with a reference voltage. In addition, at least two of the reference voltages of the first digital-to-analog converter, the second digital-to-analog converter, and the first analog-to-digital converter are dependent from each other.

The aforementioned problem is also solved by a method for controlling a rotation rate sensor. In a first control loop the method comprises the steps of: converting with a first digital-to-analog converter a first digital control signal output by a first control unit for controlling an oscillation of the rotation rate sensor along a first direction into a first analog signal by means of which the oscillation of the rotation rate sensor along the first direction can be controlled, and converting with a first analog-to-digital converter a first analog measurement signal that describes the oscillation of the rotation rate sensor along the first direction into a first digital readout signal that is supplied to the first control unit. In a second control loop the method comprises the steps of: converting with a second digital-to-analog converter a second digital control signal output by a second control unit for controlling an oscillation of the rotation rate sensor along a second direction perpendicular to the first direction into a second analog signal by means of which the oscillation of the rotation rate sensor along the second direction is controlled. Here, the first digital-to-analog converter, the second digital-to-analog converter and the first analog-to-digital converter operate each with a reference voltage during conversion. The method comprises further the step of: adjusting of a least two of the reference voltages of the first digital-to-analog converter, the second digital-to-analog converter, and the first analog-to-digital converter such that they are dependent from each other.

This setup of a control device makes it possible to cancel during a change of reference voltages of the first digital-to-analog converter, the second digital-to-analog converter and/or the first analog-to-digital converter, e.g. due to aging, the detrimental effects of the change because of compensation due to the mutual dependency of at least two of the reference voltages within the scale factor. Due to this, the dependency of the scale factor e.g. from aging of reference voltages becomes less and a higher precision and reliability of the rotation rate sensor can be achieved.

The dependency of the scale factor on changes of reference voltages, e.g. due to aging, can be reduced in this process from the fourth power to the second power. The dependency of the scale factor on aging effects may even be totally cancelled.

It is also possible to use more than one first digital-to-analog converter, one second digital-to-analog converter or one first analog-to-digital, e.g. two first digital-to-analog converters, two second digital-to-analog converters, or two first analog-to-digital converters. The references voltages of these converters are then accordingly dependent from each other.

According to an advantageous example the reference voltage of the first analog-to-digital converter may be directly proportional to the reference voltage of the first digital-to-analog converter.

This ensures that a change of the reference voltage of the first analog-to-digital converter, e.g. because of aging, causes a change of the reference voltage of the second digital-to-analog converter in the same direction. This means that if the reference voltage of the first analog-to-digital converter becomes larger in the course of time, also the reference voltage of the second digital-to-analog converter will become larger in the course of time. On the other hand, for a reduction of the reference voltage of the first analog-to-digital converter also the reference voltage of the second digital-to-analog converter becomes smaller in the course of time. The rates of change of the reference voltages may have a constant ratio. This leads to a compensation of the effects of the changes within the scale factor of the rotation rate sensor and hence to an enhanced reliability and precision of the sensor. The scale factor depends then only to the second power on aging effects of reference voltages.

According to an advantageous example the reference voltage of the first analog-to-digital converter may be directly proportional to the reference voltage of the first digital-to-analog converter.

This ensures that during a change of the reference voltage of the first digital-to-analog converter, e.g. because of aging, the reference voltage of the first digital-to-analog converter changes in the same direction as the reference voltage of the first analog-to-digital converter. This means that if the reference voltage of the first analog-to-digital converter becomes larger in the course of time, also the reference voltage of the first digital-to-analog converter will become larger in the course of time. On the other hand, during a reduction of the reference voltage of the first analog-to-digital converter also the reference voltage of the first digital-to-analog converter becomes smaller in the course of time. The rates of growth and/or reduction of the reference voltages may be coupled by a value that is constant in time, e.g. the rates of changes of the reference voltages may have constant ratios. This leads to a compensation of the effects of changes within the scale factor of the rotation rate sensor and hence to an enhanced reliability and precision of the sensor. The scale factor depends then only to the second power on changes or aging effects of the reference voltages.

According to an advantageous example the reference voltage of the first digital-to-analog converter may be directly proportional to the reference voltage of the second digital-to-analog converter and the reference voltage of the first analog-to-digital converter may simultaneously be directly proportional to the third power of the reference voltage of the first digital-to-analog converter.

This ensures that during a change of the reference voltage of the first digital-to-analog converter, e.g. because of aging, the reference voltage of the second digital-to-analog converter changes in the same direction as the reference voltage of the first digital-to-analog converter. This means that if the reference voltage of the first digital-to-analog converter becomes larger in the course of time, also the reference voltage of the second digital-to-analog converter will become larger in the course of time. On the other hand, during a reduction of the reference voltage of the first digital-to-analog converter also the reference voltage of the second digital-to-analog converter becomes smaller in the course of time. The rates of growth and/or reduction of reference voltages may be coupled over a value that is constant in time.

Simultaneously it is ensured that during a change of the reference voltage of the first analog-to-digital converter, e.g. because of aging, the reference voltage of the first digital-to-analog converter changes in the same direction and to the third power of the reference voltage of the first digital-to-analog converter. This means that a change of the reference voltage of the first analog-to-digital converter by an amount of $\Delta$ changes—for small $\Delta$—the reference voltage of the first digital-to-analog converter by an amount of $3\Delta$.

This leads to a compensation of changes or aging effects within the scale factor of the rotation rate sensor and hence to an enhanced reliability and precision of the sensor. The scale factor depends then only to the second power on changes or aging effects of the reference voltages. The dependency of the scale factor on changes or aging effects of the reference voltages may even by totally eliminated.

According to an advantageous example the reference voltage of the first digital-to-analog converter may be inversely proportional to the reference voltage of the second digital-to-analog converter or may change during aging in the opposite direction than the reference voltage of the second digital-to-analog converter.

This ensures that during a change of the reference voltage of the first digital-to-analog converter, e.g. because of aging, the reference voltage of the second digital-to-analog converter is changed in the opposite direction of the change of the reference voltage of the first digital-to-analog converter. This means that if the reference voltage of the first digital-to-analog converter becomes larger in the course of time, the reference voltage of the second digital-to-analog converter will become smaller in the course of time. On the other, during a reduction of the reference voltage of the first digital-to-analog converter the reference voltage of the second digital-to-analog converter becomes larger in the course of time. The rates of growth or reduction of the reference voltages may be coupled by a value that is constant in time, i.e. the rates of changes of the reference voltages may have constant ratios. This leads to a compensation of the changes or aging effects within the scale factor of the rotation rate sensor and hence to an enhanced reliability and precision of the sensor. The scale factor depends then only to the second power on changes or aging effects of the reference voltages.

According to an advantageous example the second control loop of the control device comprises a second analog-to-digital converter for converting a second analog measurement signal that describes the oscillation of the rotation rate sensor along the second direction into a second digital readout signal that is supplied to the second control unit. This ensures that the readout electrode can be set to the desired amplitude correctly by converting and supplying the second analog measurement signal by the second control loop. This allows a full-fledged operation of the rotation rate sensor during which also effects due to changes of reference voltages caused by aging on the measurement results are reduced.

According to an advantageous example a rotation of the rotation rate sensor around a normal being perpendicular to the first direction and the second direction may excite the oscillation of the rotation rate sensor along the second direction. This ensures that the rotation rate sensor is suitable for measuring the rotation rate via the Coriolis force, which allows an operation of the rotation rate sensor by means of Coriolis force measurements in which changes or aging effects of reference voltages on the measurement result are minimized.

According to an advantageous example the rotation rate sensor is a microelectromechanical (MEMS) gyroscope. Then, the effects detailed above can also be used for the operation of microelectromechanical gyroscopes.

In the following embodiments of the invention their functioning and their advantages will be describe with respect to the Figures. Elements of the embodiments can be combined with each other, if they do not exclude each other. It shows.

In the Figures elements or groups of elements corresponding to each other are denoted with the same reference sign.

Figure 2:
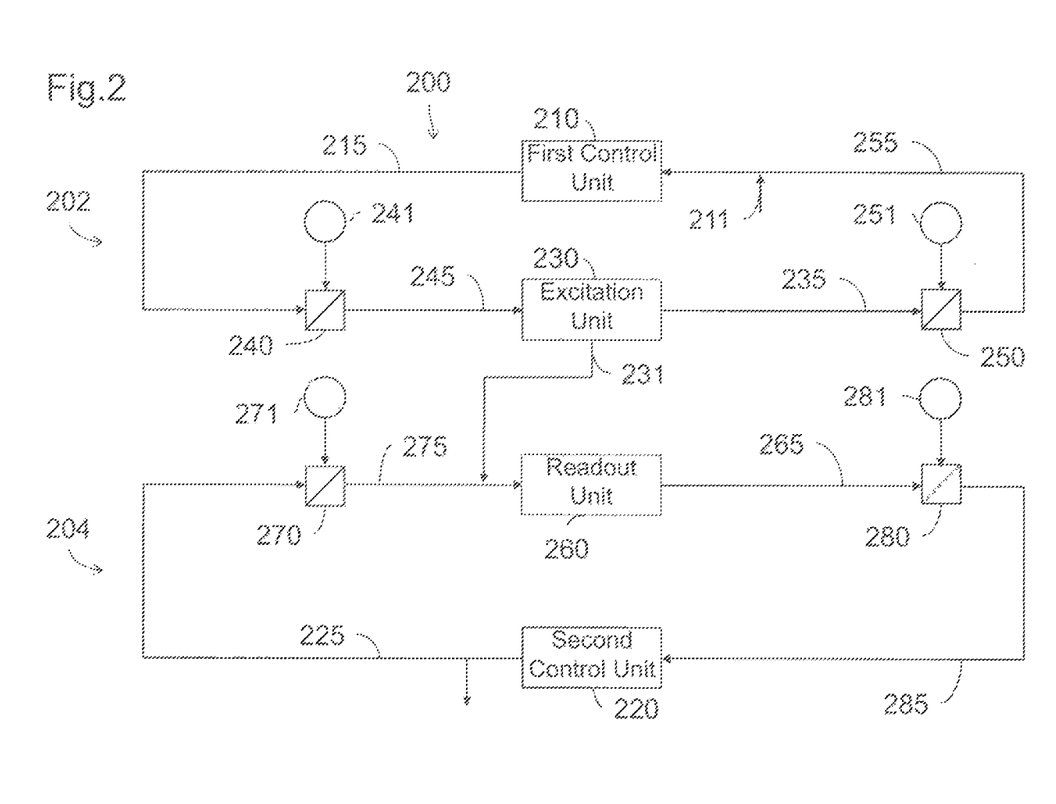
FIG. 2 a schematic block diagram of a control device for controlling a rotation rate sensor according to an embodiment.

FIG. 2 shows a schematic block diagram of a control device 200 for controlling a rotation rate sensor. The rotation rate sensor may be a sensor as described with respect to FIG. 1. The rotation rate sensor may for example be a micro-electro-mechanical sensor (MEMS).

The control device 200 comprises a first control loop 202 and a second control loop 204. The first control loop 202 comprises a first control unit 210 for controlling an excitation unit 230. The first control unit 210 may e.g. via the excitation unit 230 control an oscillation of an MEMS or of the rotation rate sensor according to FIG. 1 along a first direction, e.g. along the x-direction of FIG. 1. To this end, the excitation unit 230 may comprise one or several excitation electrodes 130 and electrodes 132 as illustrated in FIG. 1.

The first control unit 210 outputs a first digital control signal 215 that is converted by a first digital-to-analog converter 240 in a first analog signal 245. The first analog signal 245 is transferred to the excitation unit 230 and serves to adjust a frequency and/or amplitude of an oscillation that is excited by the excitation unit 230. The excitation unit 230 outputs, if the corresponding excitation electrodes 130 are used in time multiplex also as readout electrodes, a first analog measurement signal 235 that describes the oscillation of the rotation rate sensor along the first direction. This signal may also be obtained via separate electrode pairs comprised in the excitation unit 230. The first analog measurement signal 235 is converted in a first analog-to-digital converter 250 in a first digital readout signal 255 that is compared to a controller signal 211 and supplied to the first control unit 210.

The second control loop 204 comprises a second control unit 220 for controlling a readout unit 260 and hence for controlling an oscillation of the rotation rate sensor along a second direction that is different from the first direction. For example, the read out 260 may comprise a readout electrode 160 according to FIG. 1 that detects an oscillation of a readout mass along the second direction that may be for example the y-direction illustrated in FIG. 1. The oscillation detected by the readout unit 260 is caused by a rotation of the rotation rate sensor, if the amplitude of the oscillation controlled by the first control loop 202 is different from zero. This is illustrated schematically in FIG. 2 by the Coriolis signal 231.

In first iteration the Coriolis signal 231 is measured by the readout unit 260 and transmitted as second analog measurement signal 265 to a second analog-to-digital converter 280 where it is converted to a second digital readout signal 285. The second digital readout signal 285 is supplied to the second control unit 220 that outputs a second digital control signal 225 in order to set the oscillation of the rotation rate sensor along the second direction by means of electrodes that may be comprised in the readout unit 260 to zero. The second digital control signal 225 is also output to the exterior and indicates the strength of the rotation of the rotation rate sensor.

In order to be able to control the readout unit 260 effectively the second digital control signal 225 is converted in a second digital-to-analog converter 270 in a second analog signal 275 that is supplied to the readout unit 260. By using the Coriolis signal 231 and the second analog signal 275 the amplitude of an oscillation of the rotation rate sensor along the second direction may be set to zero.

The first digital-to-analog converter 240 is operated with a reference voltage $U_{RefD1}$ 241. The first digital-to-analog converter 250 is operated with a reference voltage $U_{RefA1}$ 251 and the second digital-to-analog converter 270 is operated with a reference voltage $U_{RefD2}$ 271. The reference voltages $U_{RefD1}$ 241, $U_{RefA1}$ 251, and $U_{RefD2}$ 271 contribute to the scale factor that brings the read out second digital control signal 225 into relation with the rotation rate applied to the rotation rate sensor. In addition, the second analog-to-digital converter 280 may be operated with a reference voltage $U_{RefA2}$ 281.

By the analog-to-digital/digital-to-analog converters the reference voltages are used to determine an incoming signal by comparing it with the reference voltages and are hence used to determine its size.

According to an embodiment at least two of the reference voltages $U_{RefD1}$ 241, $U_{RefA1}$ 251, and $U_{RefD2}$ 271 are dependent from each other. This ensures that aging effects of the reference voltages $U_{RefD1}$ 241, $U_{RefA1}$ 251, and $U_{RefD2}$ 271 compensate in the scale factor of the rotation rate sensor and hence that scale factor errors that are caused by aging effects are minimized. Therefore, use of the control device 200 enhances the precision and reliability of the rotation rate sensor operated with the control device 200.

Figure 3:
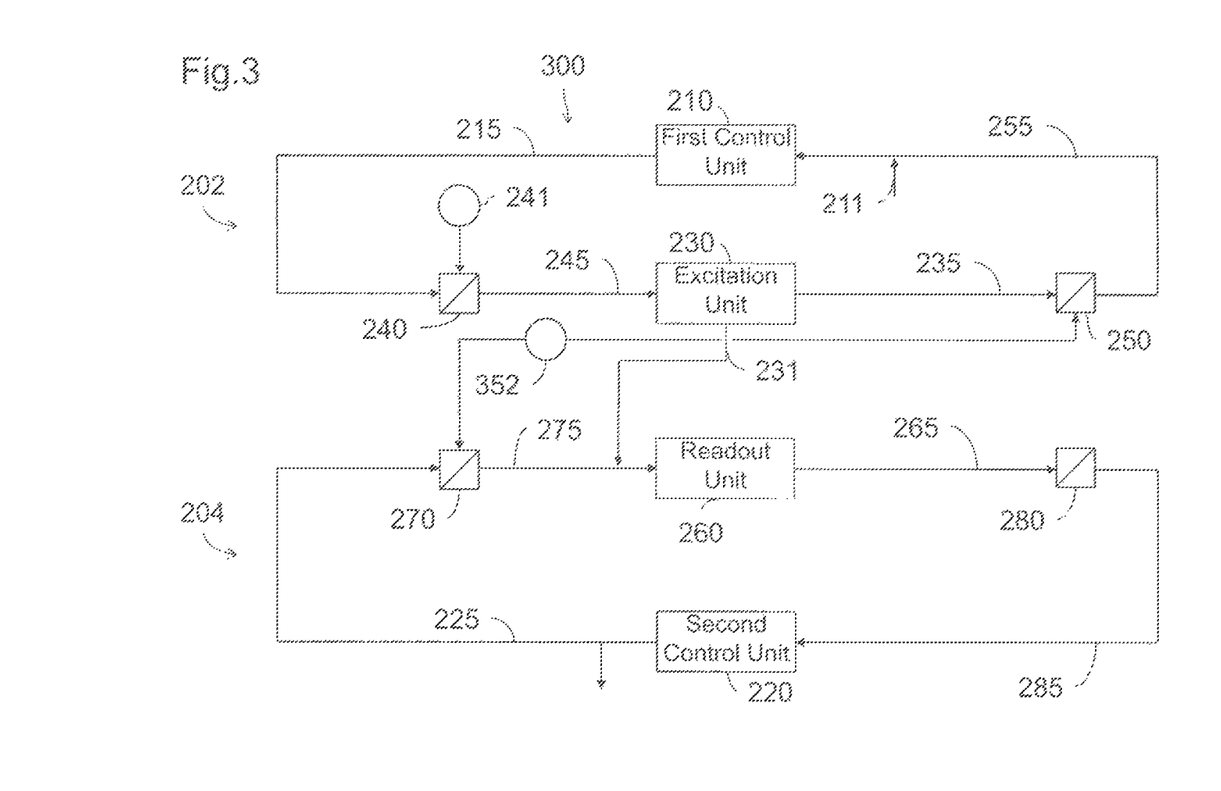
FIG. 3 a schematic block diagram of a control device for controlling a rotation rate sensor according to another embodiment.

FIG. 3 shows a schematic block diagram of a control device 300 for controlling a rotation rate sensor. The structure of the control device 300 corresponds substantially to the structure of the control device 200 shown in FIG. 2. Therefore, regarding the particular structure of the control device 300 reference is made to the description of the control device 200 illustrated in FIG. 2. Further, it should be noted that in FIG. 3, and also in FIGS. 4, 5, and 6 described below, the reference voltage $U_{RefA2}$ 281 of the second analog-to-digital converter 280 is not illustrated as this is not necessary for the further discussion of the embodiments of the control devices according to the present invention.

The control device 300 differs from the control device 200 in that the reference voltages $U_{RefA1}$ and $U_{RefD2}$ of the first analog-to-digital converter 250 and the second digital-to-analog converter 270 are directly proportional to each other. This is illustrated in FIG. 3 by the common voltage source 352 from which the reference voltages of the first analog-to-digital converter 250 and the second digital-to-analog converter 270 are derived.

This ensures that during a change of the reference voltage $U_{RefA1}$ of the first analog-to-digital converter 250 the reference voltage $U_{RefD2}$ of the second digital-to-analog converter 270 changes in the same direction as the reference voltage $U_{RefA1}$. This may for example be achieved by the common voltage source 352 illustrated in FIG. 3 from which the reference voltages $U_{RefA1}$ and $U_{RefD2}$ are derived. The reference voltages $U_{RefA1}$ and $U_{RefD2}$ may correspond directly to the voltage of the common voltage source 352, however, they may also be generated by scaling the voltage of the common voltage source 352. Then, the ratio of the reference voltages $U_{RefA1}$ and $U_{RefD2}$ has a value that is constant in time.

Alternatively, it is also possible to determine via measurements of the reference voltages over a predetermined time period, e.g. at the manufacturer, whether a reference voltage of the digital-to-analog converter or an analog-to-digital converter element that is to be used without modification in the control device 300 gets larger or smaller over time. Then, as first analog-to-digital converter 250 and second digital-to-analog converter 270 such elements can be used whose reference voltage change in the same direction. This has the advantage that an existing circuitry does not need to be changed, but only elements must be chosen, whose aging characteristic is the same.

The control device 300 illustrated in FIG. 3 allows to reduce the dependency of the scale factor from the aging of the reference voltage to the second power.

Figure 4:
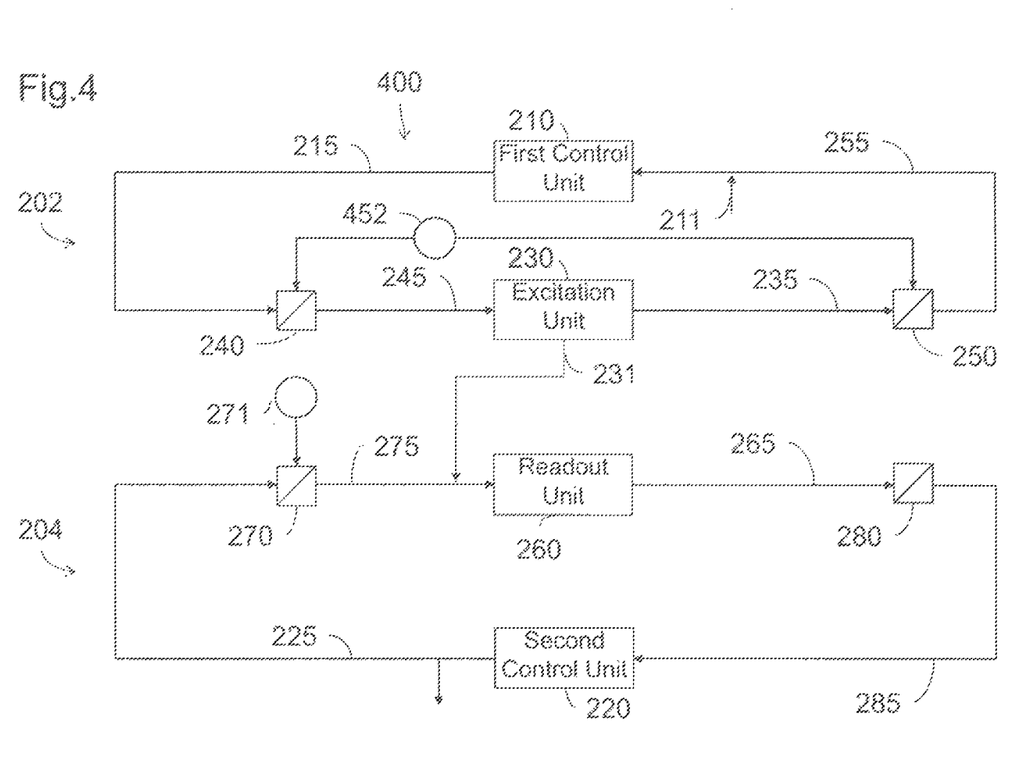
FIG. 4 a schematic bock diagram of a control device for controlling a rotation rate sensor according to another embodiment.

FIG. 4 shows a control device 400 for controlling a rotation rate sensor according to a further embodiment. The control device 400 has substantially the same structure as the control device 200 of FIG. 2. Therefore, a detailed description of the structure of the control device 400 is omitted and it is referred to the description of the control device 200.

The control device 400 differs from the control device 200 in that the reference voltage $U_{RefA1}$ of the first analog-to-digital converter 250 is directly proportional to the reference voltage $U_{RefD1}$ of the first digital-to-analog converter 240. This is illustrated in FIG. 4 by common voltage source 452 from which the reference voltages $U_{RefA1}$ and $U_{RefD1}$ of the first analog-to-digital converter 250 and the first digital-to-analog converter 240 derive, respectively.

This ensures that during a change of the reference voltage $U_{RefA1}$ of the first analog-to-digital converter 250 the reference voltage $U_{RefD1}$ of the first digital-to-analog converter 240 is changed in the same direction as the reference voltage $U_{RefA1}$. This may for example be achieved by the common voltage source 452 that is illustrated in FIG. 4, from which the reference voltages $U_{RefA1}$ and $U_{RefD1}$ are derived. The reference voltages $U_{RefA1}$ and $U_{RefD1}$ may correspond directly to the voltage of the common voltage source 452, however, they may also be generated by scaling of the voltage of the common voltage source 452. Then, the ratio of the reference voltages $U_{RefA1}$ and $U_{RefD1}$ has a value that is constant in time.

Alternatively, it is possible to determine via measurements of the reference voltages over a predetermined time period, e.g. at the manufacturer, whether a reference voltage of a digital-to-analog converter or analog-to-digital converter element that is to be used without modifications in the control device 400 becomes larger or smaller over time. Then, as first analog-to-digital converter 250 and as first digital-to-analog converter 240 elements can be used whose reference voltages change in the same direction. This has the advantage that it is not necessary to change an existing circuitry, but only to choose elements whose aging characteristic are the same.

By means of the control device 400 illustrated in FIG. 4 the dependency of the scale factor on the aging of reference voltages can be reduced to the second power.

Figure 5:
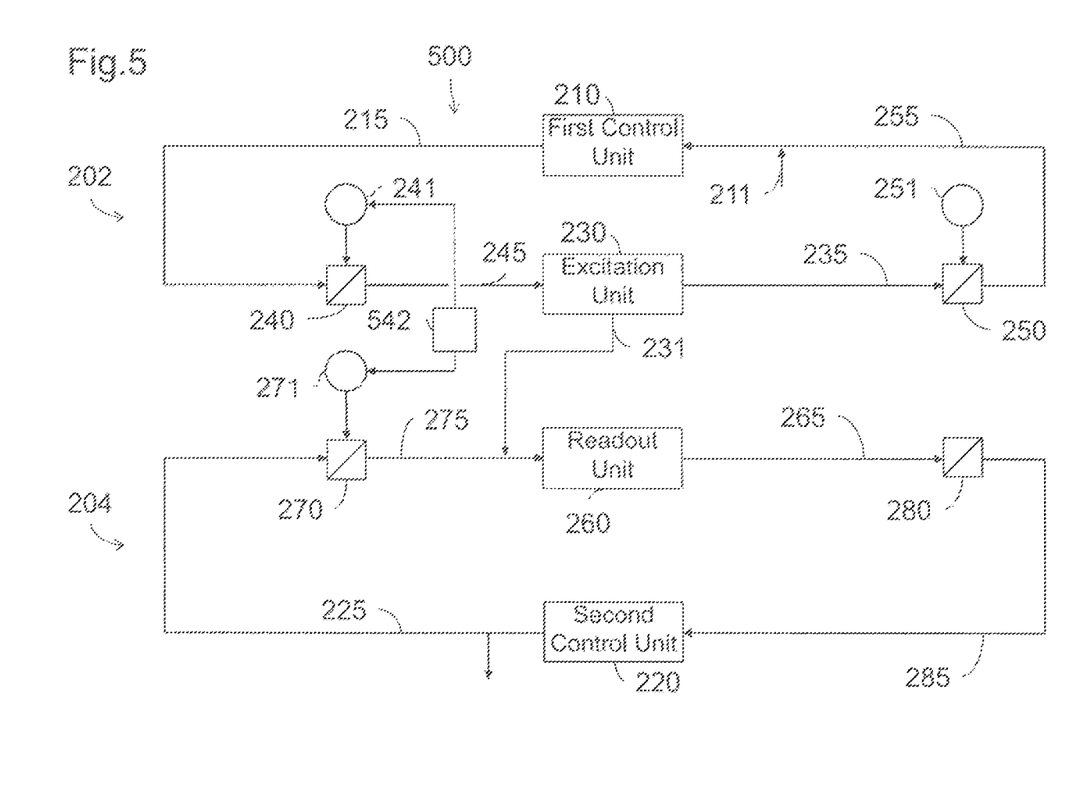
FIG. 5 a control device for controlling a rotation rate sensor according to another embodiment.

FIG. 5 shows a schematic block diagram of a control device 500 for controlling a rotation rate sensor according to a further embodiment. The structure of the control device 500 corresponds substantially to the structure of the control device 200 illustrated in FIG. 2. Hence, here a detailed description of the control device 500 is omitted and it is referred to the description of the control device 200.

The control device 500 differs from the control device 200 in that the reference voltage $U_{RefD1}$ of the first digital-to-analog converter 240 is inversely proportional (i.e. reciprocal) to the reference voltage $U_{RefD2}$ of the second digital-to-analog converter 270. This is illustrated in FIG. 5 by the reciprocity element 542.

This ensures that during a change of the reference voltage $U_{RefD1}$ of the first digital-to-analog converter 240 the reference voltage $U_{RefD2}$ of the second digital-to-analog converter 270 changes oppositely to the reference voltage $U_{RefD1}$. This may for example be achieved by the reciprocity element 542 illustrated in FIG. 5 that either outputs a value reciprocal to the reference voltage $U_{RefD1}$ of the first digital-to-analog converter 240 (i.e. it inverts the reference voltage $U_{RefD1}$) and transfers it as reference voltage $U_{RefD2}$ to the second digital-to-analog converter 270, or that outputs a value reciprocal to the reference voltage $U_{RefD2}$ of the second digital-to-analog converter 270 and transmits it as reference voltage $U_{RefD1}$ to the first digital-to-analog converter 240. In addition, the reference voltages $U_{RefD1}$ and $U_{RefD2}$ may be scaled before and/or after inverting. The product of the reference voltages $U_{RefD1}$ and $U_{RefD2}$ has then a constant value in time.

Alternatively, it is possible to determine by means of measurements of the reference voltages over a predetermined time period, e.g. at the manufacturer, whether a reference voltage of one of the digital-to-analog converter elements that is to be used without modifications in the control device 500 is getting smaller or lager over time. Then, as first digital-to-analog converter 240 and as second digital-to-analog converter 270 such elements can be used whose reference voltages change oppositely from each other. This has the advantage that it is not necessary to change an existing circuitry, but only to choose elements whose aging characteristic is opposite.

By means of the control device 500 illustrated in FIG. 5 the dependency of the scale factor from aging of reference voltages can be reduced to the second power.

Figure 6:
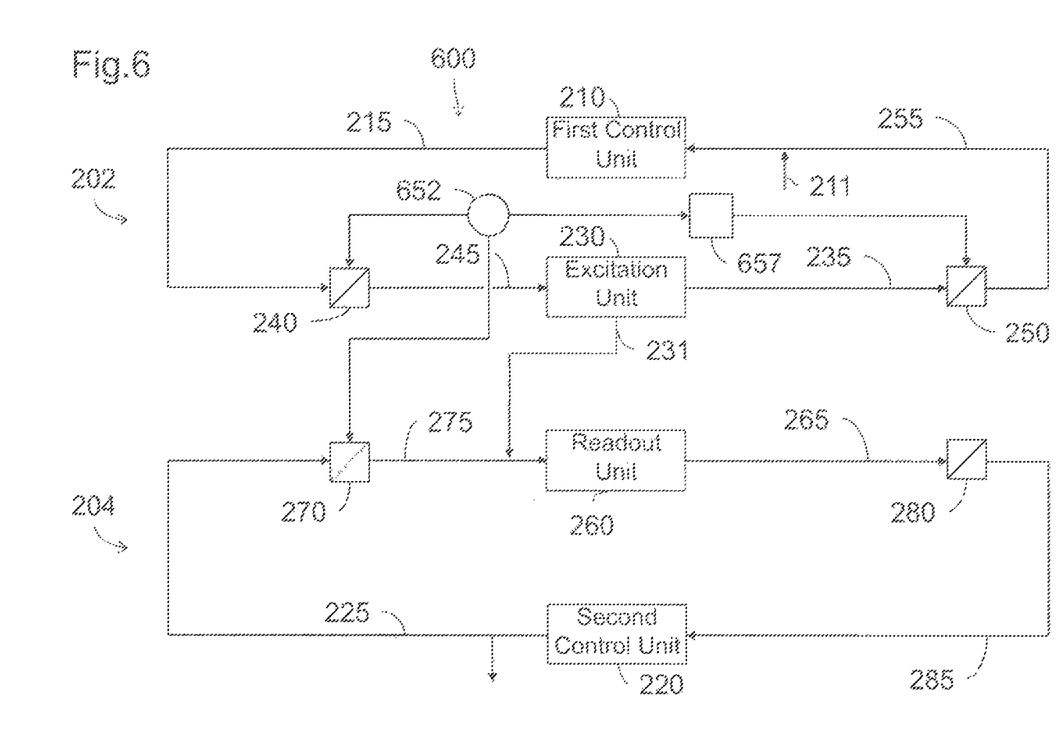
FIG. 6 a schematic block diagram of a control device for controlling a rotation rate sensor according to another embodiment.

FIG. 6 shows a schematic block diagram of a control device 600 for controlling a rotation rate sensor according to a further embodiment. The structure of the control device 600 corresponds substantially to the structure of the control device 200. Therefore, a detailed description of the control device 600 is omitted and it is referred to the description of the control device 200.

The control device 600 differs from the control device 200 in that the reference voltage $U_{RefD1}$ of the first digital-to-analog converter 240 is directly proportional to the reference voltage $U_{RefD2}$ of the second digital-to-analog converter and that the reference voltage $U_{RefA1}$ of the first analog-to-digital converter 250 is directly proportional to the third power of the reference voltage $U_{RefD1}$ of the first digital-to-analog converter 240. This is illustrated in FIG. 6 by a common voltage source 652 and a raising element 657.

This ensures that during a change of the reference voltage $U_{RefD1}$ of the first digital-to-analog converter 240 the reference voltage $U_{RefD2}$ of the second digital-to-analog converter 270 changes in the same direction as the reference voltage $U_{RefD1}$. This may for example be achieved by the common voltage source 652 illustrated in FIG. 6 from which the reference voltages $U_{RefD1}$ and $U_{RefD2}$ are derived. The reference voltages $U_{RefD1}$ and $U_{RefD2}$ may correspond directly to the voltage of the common voltage source 652, however, they may also be generated by scaling the voltage of the common voltage source 652. Then, the ratio of the reference voltages $U_{RefD1}$ and $U_{RefD2}$ is constant in time.

Alternatively, it is possible to determined by measurements of the reference voltages over a certain time period, e.g. at the manufacturer, whether a reference voltage of one of the digital-to-analog converter elements that is to be used without modifications in the control device 600 becomes lager or smaller over time. Then, as first digital-to-analog converter 240 and as second digital-to-analog converter 270 such elements can be used whose reference voltages change in the same manner. This has the advantage that it is not necessary to change an existing circuitry, but only to choose elements whose aging characteristic is the same.

Simultaneously it is ensured that during a change of the reference voltage $U_{RefA1}$ of the first analog-to-digital converter 250 by an amount of Δ, with Δ being small, the reference voltage $U_{RefD1}$ of the first digital-to-analog converter 240 is changed by an amount proportional to 3Δ. This may be achieved by connecting the inputs of the raising element 657 with the common voltage source 652, if the ratio of $U_{RefD1}$ to $U_{RefD2}$ is constant over time. Alternatively, the input of the raising element 657 is connected to one of the reference voltages $U_{RefD1}$, $U_{RefD2}$ which change in the same manner, as has been determined based on measurements.

By means of the control device 600 illustrated in FIG. 6 the dependency of the scale factor on the aging of the reference voltages may be reduced to the second power or may even be totally eliminated.

According to further not illustrated embodiments the control devices illustrated in FIGS. 2 to 6 may be combined with each other in order to reduce the dependency of the scale factor from aging of reference voltages even further, if the illustrated embodiments do not exclude each other.

Figure 7:
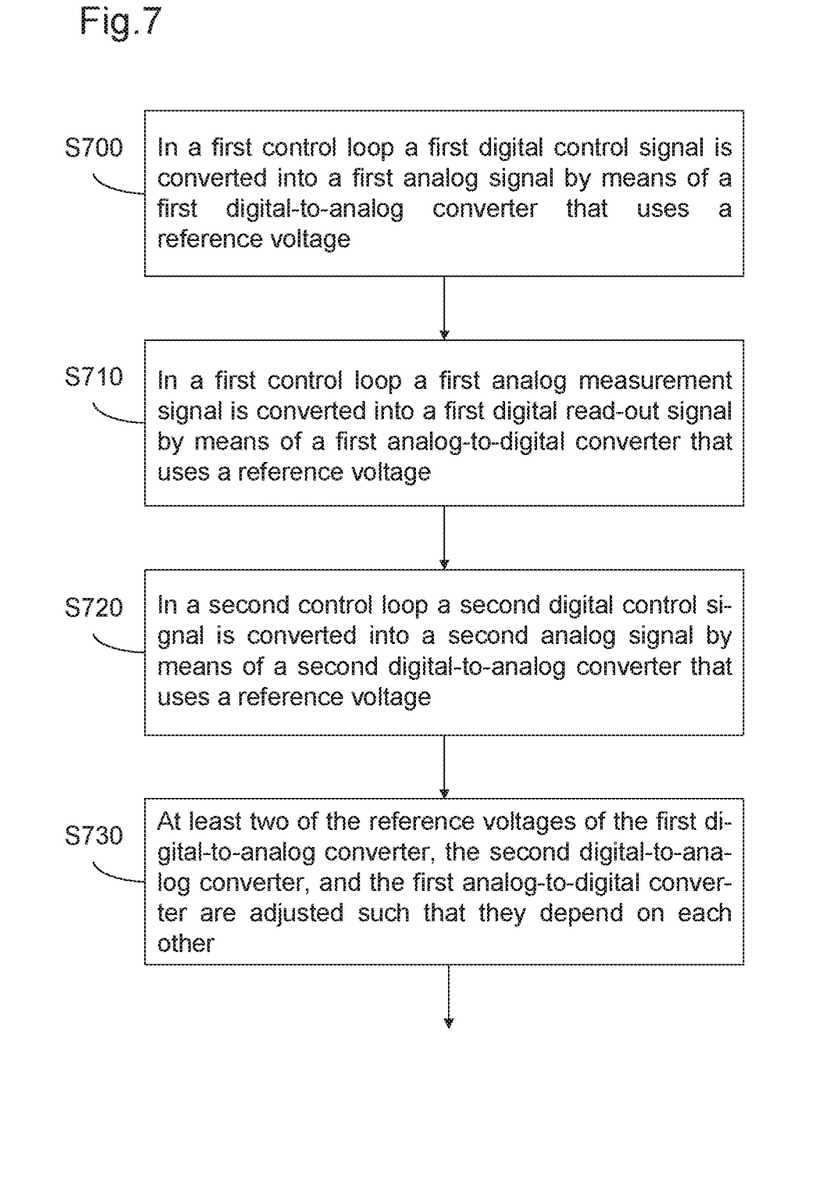
FIG. 7 a schematic process flow of a method for controlling a rotation rate sensor according to an embodiment.

FIG. 7 shows a schematic process flow of a method for controlling a rotation rate sensor according to an embodiment.

At S700 in a first control loop a first control signal is converted into a first analog signal by means of a first digital-to-analog converter that uses a reference voltage.

At S710 in the first control loop a first analog measurement signal is converted into a first digital readout signal by means of a first analog-to-digital converter that uses a reference voltage.

At S720 a second digital control signal is converted in a second control loop into a second analog signal by means of a second digital-to-analog converter that uses a reference voltage.

At S730 at least two of the reference voltages of the first digital-to-analog converter, the second digital-to-analog converter and the first analog-to-digital converter are adjusted such that they depend from each other.

This ensures that aging effects of the reference voltages that contribute to the scale factor of the rotation rate sensor compensate such that scale factor errors are minimized. This makes the rotation rate sensor more precise and reliable.

According to further embodiments the reference voltages of the first digital-to-analog converter, the second digital-to-analog converter, and the first analog-to-digital converter can be adjusted according to one of the embodiments of a control device discussed above with respect to FIGS. 3 to 6. Due to this, the dependency of the scale factor from aging effects of reference voltages can be reduced to a quadratic dependency or may be eliminated totally.

The invention claimed is:

1. A control device for controlling a rotation rate sensor, comprising
a first control loop, comprising
a first control unit for controlling an oscillation of the rotation rate sensor along a first direction,
a first digital-to-analog converter for converting a first digital control signal output from the first control unit into a first analog signal by means of which the oscillation of the rotation rate sensor along the first direction is controlled, and
a first analog-to-digital converter for converting a first analog measurement signal that describes the oscillation of the rotation rate sensor along the first direction into a first digital read-out signal that is supplied to the first control unit; and comprising
a second control loop, comprising
a second control unit for controlling an oscillation of the rotation rate sensor along a second direction different from the first direction,
a second digital-to-analog converter for converting a second digital control signal output from the second control unit into a second analog signal by means of which the oscillation of the rotation rate sensor along the second direction is controlled; and
a second analog-to-digital converter for converting a second analog measurement signal that describes the oscillation of the rotation rate sensor along the second direction into a second digital read-out signal that is supplied to the second control unit, wherein
the first digital-to-analog converter, the second digital-to-analog converter, and the first analog-to-digital converter operate during conversion each with a reference voltage;
at least two of the reference voltages of the first digital-to-analog converter, the second digital-to-analog converter, and the first analog-to-digital converter are dependent from each other, wherein the reference voltage of the first digital-to-analog converter changes oppositely to the reference voltage of the second digital-to-analog converter, if the reference voltages of the first digital-to-analog converter and the second digital-to-analog converter change due to aging.

2. The control device according to claim 1, wherein the reference voltage of the first analog-to-digital converter is directly proportional to the reference voltage of the second digital-to-analog converter.

3. The control device according to claim 1, wherein the reference voltage of the first analog-to-digital converter is directly proportional to the reference voltage of the first digital-to-analog converter.

4. The control device according to one of claim 1, wherein the reference voltage of the first digital-to-analog converter is directly proportional to the reference voltage of the second digital-to-analog converter and the reference voltage of the first analog-to-digital converter is directly proportional to the third power of the reference voltage of the first digital-to-analog converter.

5. The control device according to claim 1, wherein the reference voltage of the first digital-to-analog converter is inversely proportional to the reference voltage of the second digital-to-analog converter.

6. The control device according to claim 1, wherein a rotation of the rotation rate sensor around a normal perpendicular to the first direction and the second direction causes the oscillation of the rotation rate sensor along the second direction.

7. The control device according to claim 1, wherein the rotation rate sensor is a micro-electro-mechanical (MEMS) gyroscope.

8. Method for controlling a rotation rate sensor comprising the steps:
in a first control loop
converting with a first digital-to-analog converter a first digital control signal output by a first control unit for controlling an oscillation of the rotation rate sensor along a first direction into a first analog signal by means of which the oscillation of the rotation rate sensor along the first direction is controlled, and
converting with a first analog-to-digital converter a first analog measurement signal that describes the oscillation of the rotation rate sensor along the first direction into a first digital read-out signal that is supplied to the first control unit;
in a second control loop
converting with a second digital-to-analog converter a second digital control signal output by a second control unit for controlling an oscillation of the rotation rate sensor along a second direction being different from the first direction into a second analog signal by means of which the oscillation of the rotation rate sensor along the second direction is controlled and;
converting with a second analog-to-digital converter a second analog measurement signal that describes the oscillation of the rotation rate sensor along the second direction into a second digital read-out signal that is supplied to the second control unit, wherein
the first digital-to-analog converter, the second digital-to-analog converter and the first analog-to-digital converter operate during conversion each with a reference voltage; and
at least two of the reference voltages of the first digital-to-analog converter, the second digital-to-analog converter, and the first analog-to-digital converter are adjusted such that they dependent on each other, the reference voltage of the first digital-to-analog converter changes oppositely to the reference voltage of the second digital-to-analog converter, if the reference voltages of the first digital-to-analog converter and the second digital-to-analog converter change due to aging.

\* \* \* \* \*

UNITED STATES PATENT AND TRADEMARK OFFICE
CERTIFICATE OF CORRECTION

PATENT NO. : 9,874,445 B2
APPLICATION NO. : 15/324383
DATED : January 23, 2018
INVENTOR(S) : Ralf Richard Ohmberger et al.

It is certified that error appears in the above-identified patent and that said Letters Patent is hereby corrected as shown below:

In the Claims

Column 11, Line 63 reads "digital-to-analog" should read --analog-to-digital--

Column 12, Line 64 reads "digital-to-analog" should read --analog-to-digital--

Signed and Sealed this
Twelfth Day of June, 2018

Andrei Iancu
*Director of the United States Patent and Trademark Office*